United States Patent
Kansky et al.

(10) Patent No.: US 11,699,096 B2
(45) Date of Patent: Jul. 11, 2023

(54) SYSTEMS AND METHODS FOR EVENT PREDICTION USING SCHEMA NETWORKS

(71) Applicant: Intrinsic Innovation LLC, Mountain View, CA (US)

(72) Inventors: Kenneth Alan Kansky, Union City, CA (US); Tom Silver, Union City, CA (US); David A. Mely, Union City, CA (US); Mohamed Eldawy, Union City, CA (US); Miguel Lazaro Gredilla, Union City, CA (US); Dileep George, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 797 days.

(21) Appl. No.: 16/695,576

(22) Filed: Nov. 26, 2019

(65) Prior Publication Data

US 2020/0097844 A1 Mar. 26, 2020

Related U.S. Application Data

(63) Continuation of application No. 16/005,227, filed on Jun. 11, 2018, now Pat. No. 10,521,725.

(60) Provisional application No. 62/518,072, filed on Jun. 12, 2017.

(51) Int. Cl.
| | | |
|---|---|---|
| G06N 20/00 | (2019.01) | |
| G06N 5/04 | (2023.01) | |
| G06T 7/73 | (2017.01) | |
| G06N 3/08 | (2023.01) | |
| G06N 5/022 | (2023.01) | |
| G06F 18/20 | (2023.01) | |
| G06N 3/04 | (2023.01) | |
| G06N 7/01 | (2023.01) | |

(52) U.S. Cl.
CPC ............. *G06N 20/00* (2019.01); *G06F 18/29* (2023.01); *G06N 3/08* (2013.01); *G06N 5/022* (2013.01); *G06N 5/04* (2013.01); *G06N 5/042* (2013.01); *G06T 7/75* (2017.01); *G06N 3/04* (2013.01); *G06N 7/01* (2023.01)

(58) Field of Classification Search
None
See application file for complete search history.

(56) References Cited

U.S. PATENT DOCUMENTS

| | | |
|---|---|---|
| 7,792,769 B2 | 9/2010 | Kant et al. |
| 8,346,505 B2 | 1/2013 | Martinez-Heras et al. |
| 9,373,085 B1 | 6/2016 | George et al. |

(Continued)

OTHER PUBLICATIONS

International Search Report and Written Opinion for International Application No. PCT/US18/36905 dated Aug. 31, 2018.

(Continued)

*Primary Examiner* — Alan Chen
(74) *Attorney, Agent, or Firm* — Fish & Richardson P.C.

(57) ABSTRACT

A system for event prediction using schema networks includes a first antecedent entity state that represents a first entity at a first time; a first consequent entity state that represents the first entity at a second time; a second antecedent entity state that represents a second entity at the first time; and a first schema factor that couples the first and second antecedent entity states to the first consequent entity state; wherein the first schema factor is configured to predict the first consequent entity state from the first and second antecedent entity states.

21 Claims, 13 Drawing Sheets

(56) References Cited

U.S. PATENT DOCUMENTS

| | | |
|---|---|---|
| 2002/0152185 A1 | 10/2002 | Satish |
| 2004/0250261 A1 | 12/2004 | Huibregtse |
| 2007/0094219 A1 | 4/2007 | Kipersztok |
| 2009/0043593 A1 | 2/2009 | Herbrich et al. |
| 2011/0077923 A1 | 3/2011 | Bond et al. |
| 2011/0313548 A1 | 12/2011 | Taylor et al. |
| 2013/0204815 A1 | 8/2013 | Grothmann et al. |
| 2016/0260009 A1 | 9/2016 | George et al. |
| 2018/0276464 A1 | 9/2018 | Hawkins et al. |

OTHER PUBLICATIONS

Kansky, Ken, et al., "Schema Networks: Zero-shot Transfer with a Generative Casual Model of Intuitive Physics", Aug. 17, 2017.
European Search Report for application No. 18816607.8 dated Feb. 9, 2021.
Lipton, Zachary C., et al., "A Critical Review of Recurrent Neural Networks for Sequence Learning", arXiv:1506.00019v4 [cs.LG], https://arxiv.org/pdf/1506.00019.pdf, Oct. 17, 2015.
International Preliminary Report on Patentability in International Application No. PCT/US18/36905, dated Dec. 17, 2019, 6 pages.

SYSTEMS AND METHODS FOR EVENT PREDICTION USING SCHEMA NETWORKS

CROSS-REFERENCE TO RELATED APPLICATIONS

This application is a continuation of U.S. application Ser. No. 16/005,227, filed 11 Jun. 2018, which claims the benefit of U.S. Provisional Application Ser. No. 62/518,072, filed on 12 Jun. 2017, which is incorporated in its entirety by this reference.

TECHNICAL FIELD

This invention relates generally to the artificial intelligence field, and more specifically to new and useful systems and methods for event prediction using schema networks in the artificial intelligence field.

BACKGROUND

While computer vision remains a complex problem in artificial intelligence, recent achievements such as the recursive cortical network (RCN) have enabled computers to identify objects from visual data efficiently and with high accuracy. However, just as with human vision, object recognition is only a part of the skillset needed to effectively interact with an environment. Humans observe how objects interact with each other to infer properties of those objects; for example, by observing how a sphere reacts when dropped onto a hard surface, a human may be able to infer whether a ball is made of rubber, cork, or steel. This knowledge makes it easier to accurately interpret past events, and likewise, to predict future events.

Unfortunately, traditional approaches to computer vision are often inefficient at modeling the latent properties of objects observed from visual data. Thus, there is a need in the artificial intelligence field to create new and useful systems and methods for event prediction using schema networks. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

One of the great problems of artificial intelligence research is that of generalization. Researchers have struggled to create machine learning models that are able to efficiently generalize information learned in training to new problems; resultantly, these models suffer in performance without exhaustive training (if such training is even feasible).

Some have attempted to address this issue by integrating object-based and relational representations in their models. For example, the Gestalt principle states that the ability to perceive objects as bounded figures in front of an unbounded background is fundamental to all visual perception. In this field, researchers have created models that detect objects and assign hardcoded properties to these objects (and/or to relationships between objects) to aid in recognition. While reasoning forward with such models (i.e., predicting future states of an environment based on contextual input) is relatively straightforward, reasoning backward is difficult if not impossible. Resultantly, these systems may be incapable of providing explanations for past events or determining causality.

The systems and methods of the present application are directed to event prediction using schema networks. More specifically, these systems and methods rely on the implementation of a generative model which allows for both forward and backward reasoning (enabling different causes of events to be distinguished) and does not require that latent properties of objects or relationships between objects be hardcoded (increasing the flexibility and usefulness of the model in generalization).

1. System for Event Prediction

Figure 1:
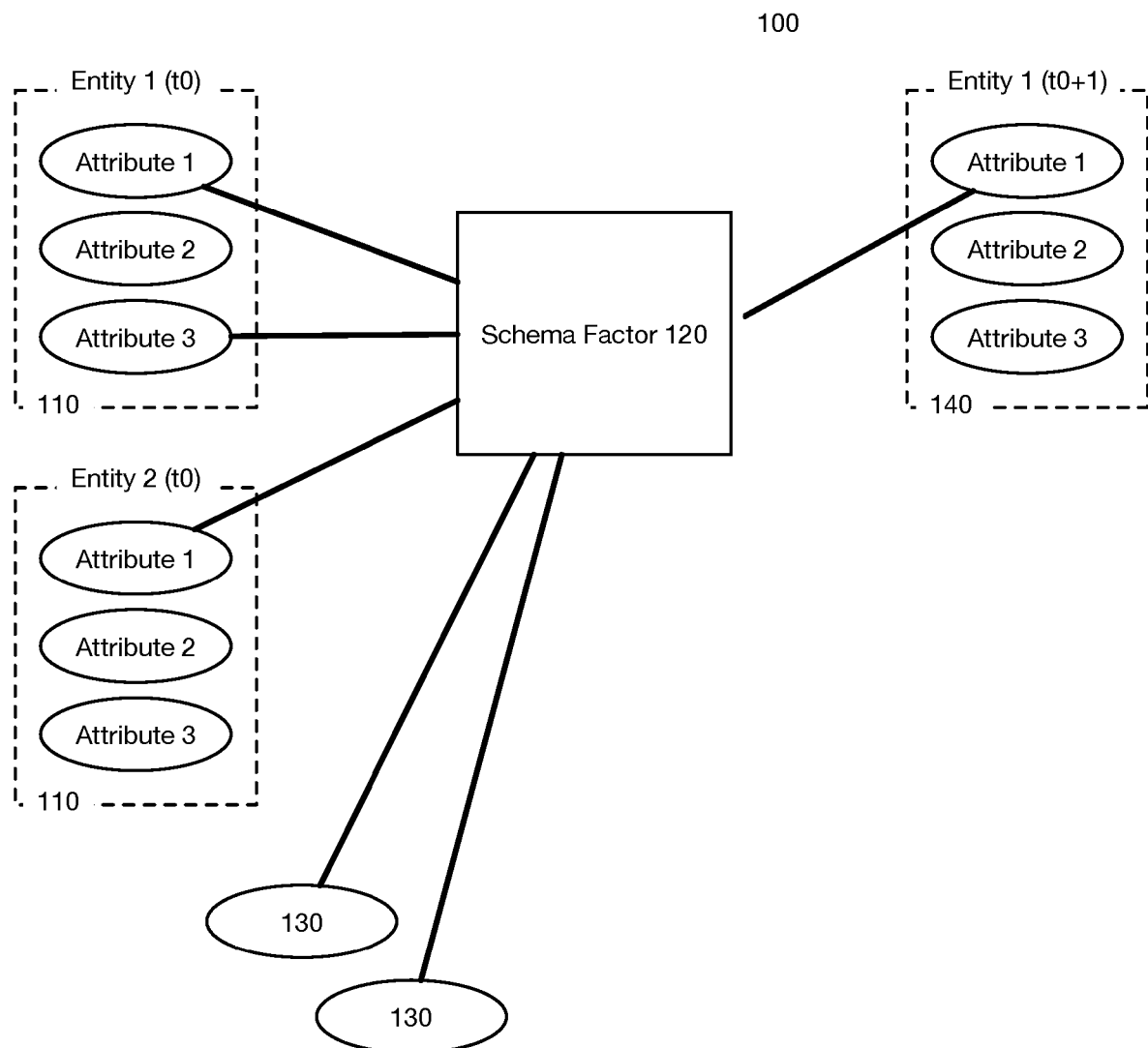
FIG. 1 is a factor graph representation of a system of an invention embodiment.

A system 100 for event prediction using schema networks includes antecedent entity states 110, schema factors 120, and consequent entity states 140, as shown in FIG. 1. The system 100 may additionally include context variables 130.

The system 100 is implemented using a generative neural network. Neural networks and related systems, including recursive cortical networks (RCNs), convolutional neural networks (CNNs), hierarchical compositional networks (HCNs), HMAX models, Slow Feature Analysis (SFA) systems, and Hierarchical Temporal Memory (HTM) systems may be used for a wide variety of tasks that are difficult to complete using standard rule-based programming. These tasks include many in the important fields of computer vision and speech recognition.

Neural networks and related systems can be represented as distributed processing elements that implement summation, multiplication, exponentiation or other functions on the elements incoming messages/signals. Such networks can be enabled and implemented through a variety of implementations. For example, a system may be implemented as a network of electronically coupled functional node components. The functional node components can be logical gates arranged or configured in a processor to perform a specified function. As a second example, the system may be implemented as a network model programmed or configured to be operative on a processor. The network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data.

The system 100 functions to enable event prediction (e.g., predicting future state given an initial state and input), event explanation (e.g., determining what input caused an entity to change state from an initial state to a future state), and regression planning (e.g., determining what input could cause an entity to change state from an initial state to a desired future state).

The system 100 operates on entities: groups of attributes associated with at least one observable feature. For example, the system 100 may include an entity for a ball detected by visual perception; the ball in turn may have a number of attributes associated with it, such as position, hardness, and friction coefficient. Entity attributes are represented by variables; at least one of these variables is preferably observable, while others may be either observable or latent (noting that a latent variable is a variable whose value is not directly observed, but rather inferred from observation of observable variables). For example, the ball's position is an observable variable (since the position may be tracked by visual perception), while the ball's hardness and friction coefficient are latent variables.

Variables of the system 100 are preferably binary random variables, but may additionally or alternatively be multinomial random variables. Further, continuous variables may be represented by a binary discretization (a continuous variable is represented by a set of binary variables). Alternatively, variables of the system 100 may be of any type and may be expressed in any manner.

Each entity may be associated with a number of states; each state represents a set of values for an entity's attributes at a particular time. By linking different time states of an entity to contextual information (e.g., the states of other entities, context variables 130, etc.) via schema factors 120, the system 100 can be used to predict future entity states, to explain past entity states, to explore the effects various contextual data has on entity state, and/or to determine what context might be necessary to cause a particular entity state.

Entity attributes are preferably universal; that is, each entity of the system 100 has the same set of attribute variables (which may take on any allowed values for a given entity state). Alternatively, entities may have one or more non-universal attributes. The set of attribute variables corresponding to a given entity may be referred to as an attribute set.

In a given state transition, an antecedent entity state 110 is an initial entity state (e.g., time=t), while a consequent entity state 140 is a later entity state (e.g., time=t+1). Alternatively, a consequent entity state 140 may be at the same time as an antecedent entity state 110 (e.g., when one event causes another to occur simultaneously or substantially simultaneously). Note that these terms are used in the context of a given state transition; for example, for an entity with three states (S1 at t=t0, S2 at t=t0+1, S3 at t=t0+2), S2 is consequent to S1 but antecedent to S3.

Figure 2:
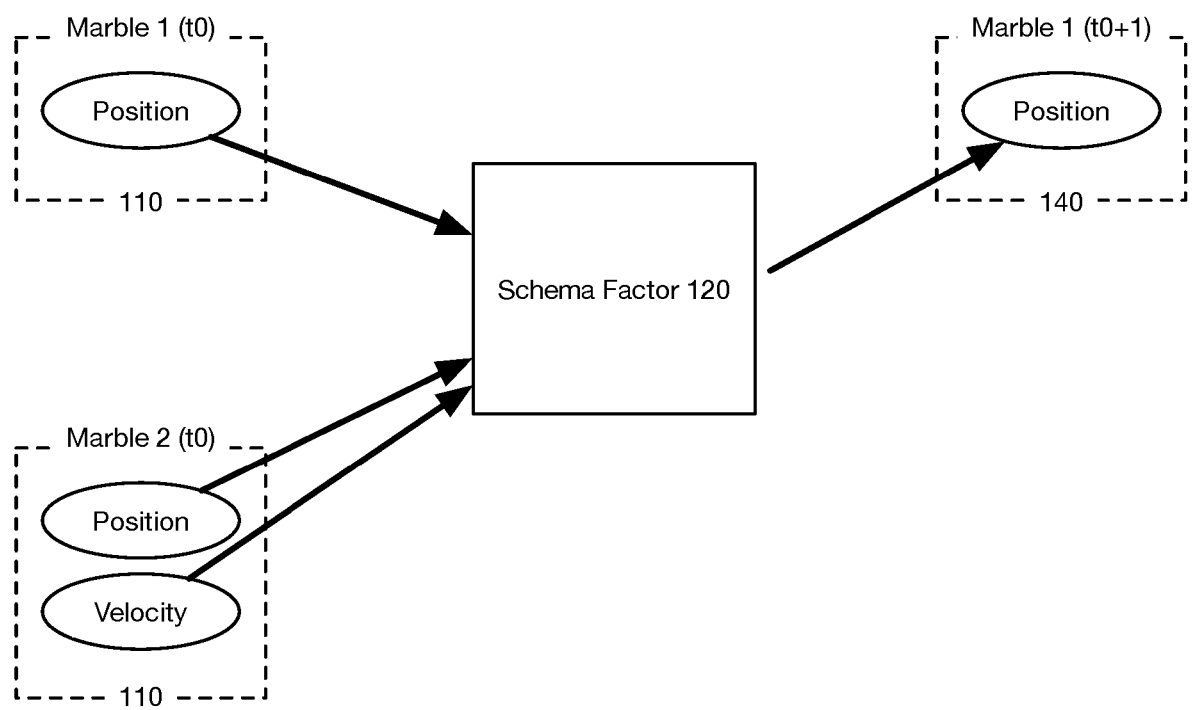
FIG. 2 is a factor graph representation of a system of an invention embodiment.

Each schema factor 120 preferably represents a conditional distribution predicting an entity state transition when certain conditions are satisfied. For example, a schema factor 120 may be used to model one marble being moved by another after a collision, as shown in FIG. 2. In this example, if Marble 2 is in contact with Marble 1 and has a non-zero velocity at time to, the position of Marble 1 will be changed by collision with Marble 2 at time t=t0+1. A set of schema factors 120 may be used to model many or all of the observable attributes of an entity in this way; for example, a second schema factor 120 may be used to determine position change of Marble 2 caused by Marble 1, a third schema factor 120 may be used to determine position change of Marble 1 due to gravity, etc.

Figure 3:
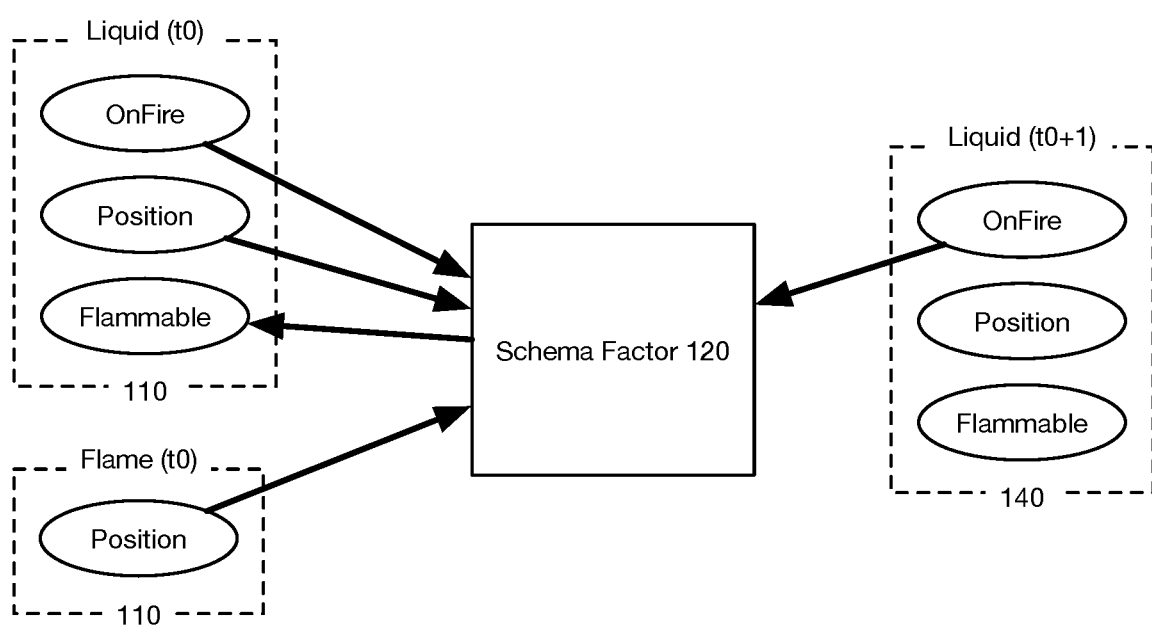
FIG. 3 is a factor graph representation of a system of an invention embodiment.
Figure 4:
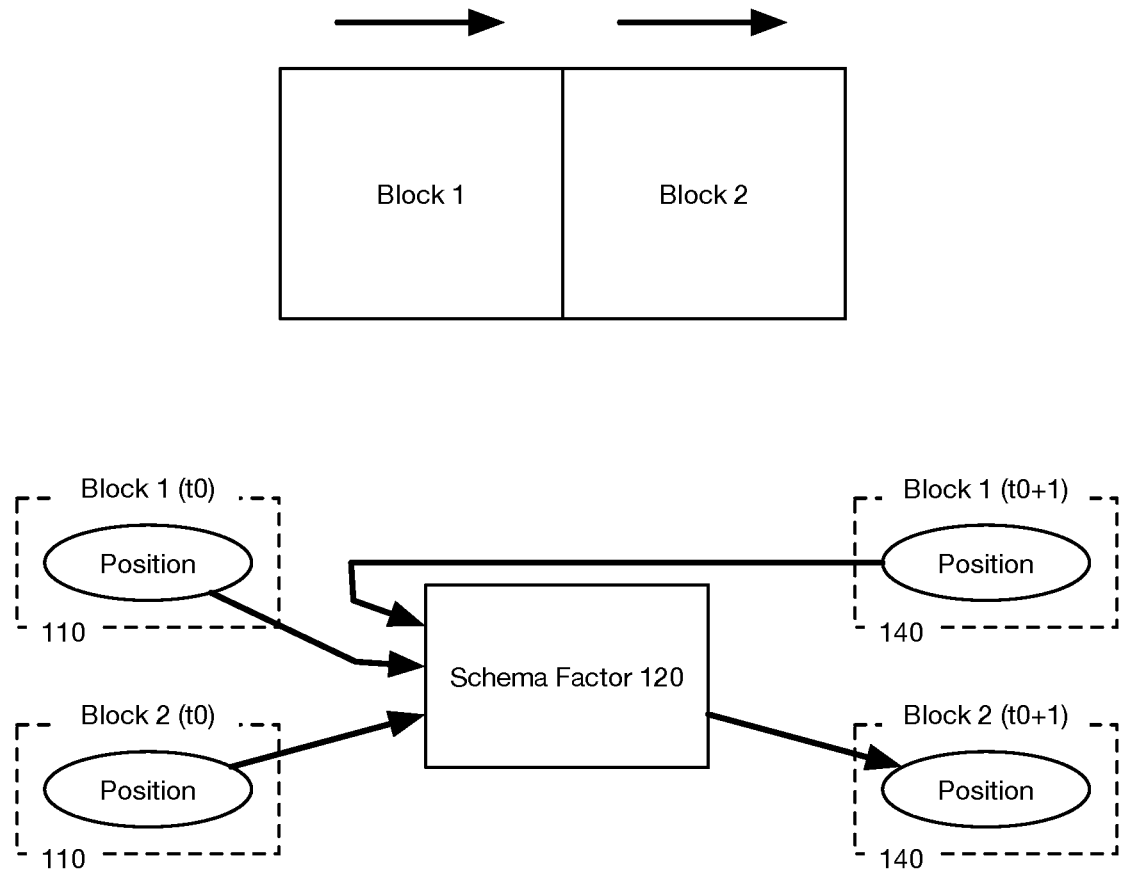
FIG. 4 is a factor graph representation of a system of an invention embodiment.

These examples show how the system 100 enables event prediction via schema factors 120. Likewise, as shown in FIG. 3, the system 100 may enable event explanation: here, backward message propagation identifies that a liquid's flammability in the presence of a nearby flame results in the liquid catching fire (transitioning from OnFire false to true). And as shown in FIG. 4, consequent states may be predicted or explained by the system 100 even when occurring simultaneously with antecedent states; for example, the system 100 may model how pushing a first block to the right also simultaneously pushes a second block directly to the right of the first block.

Schema factors may also be used to predict rewards given to a reinforcement learning agent.

Figure 5:
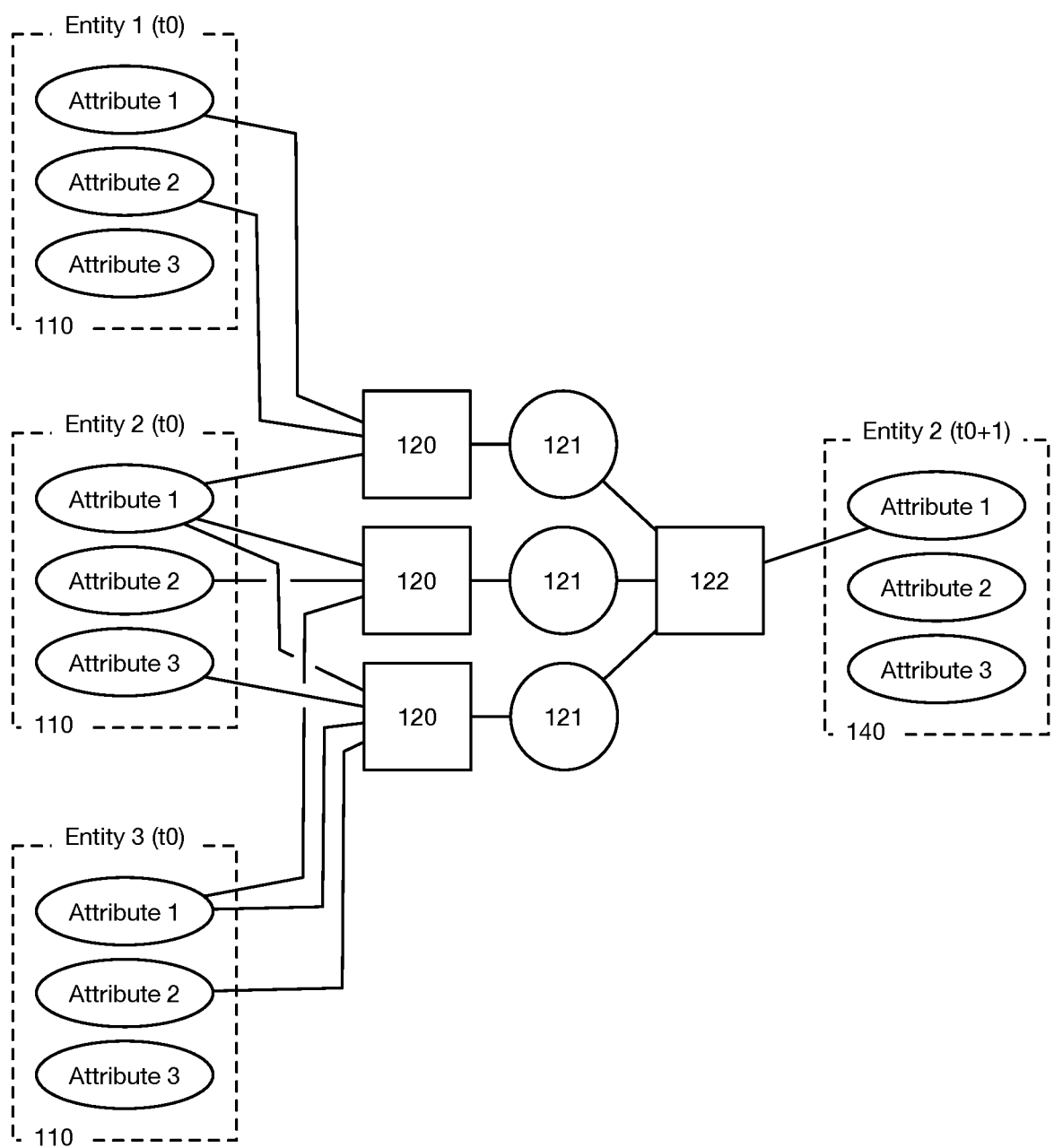
FIG. 5 is a factor graph representation of a system of an invention embodiment.

In many implementations of the system 100, it may be possible for multiple schemas to predict a given state. In such implementations, the system 100 may include a mechanism for selecting a casual schema, an example of which is as shown in FIG. 5. In this example mechanism, the system 100 includes a schema variable 121 for each schema factor 120, as well as a schema OR factor 122. A schema variable 121 represents the probability that a given schema factor 120 results in a state change, while the schema OR factor integrates all modeled causation on the same attribute variable, enabling reasoning with proper explaining-away. In the example as shown in FIG. 5, each schema factor 120 provides a schema for a transition of Attribute 1 of Entity 2.

Figure 6:
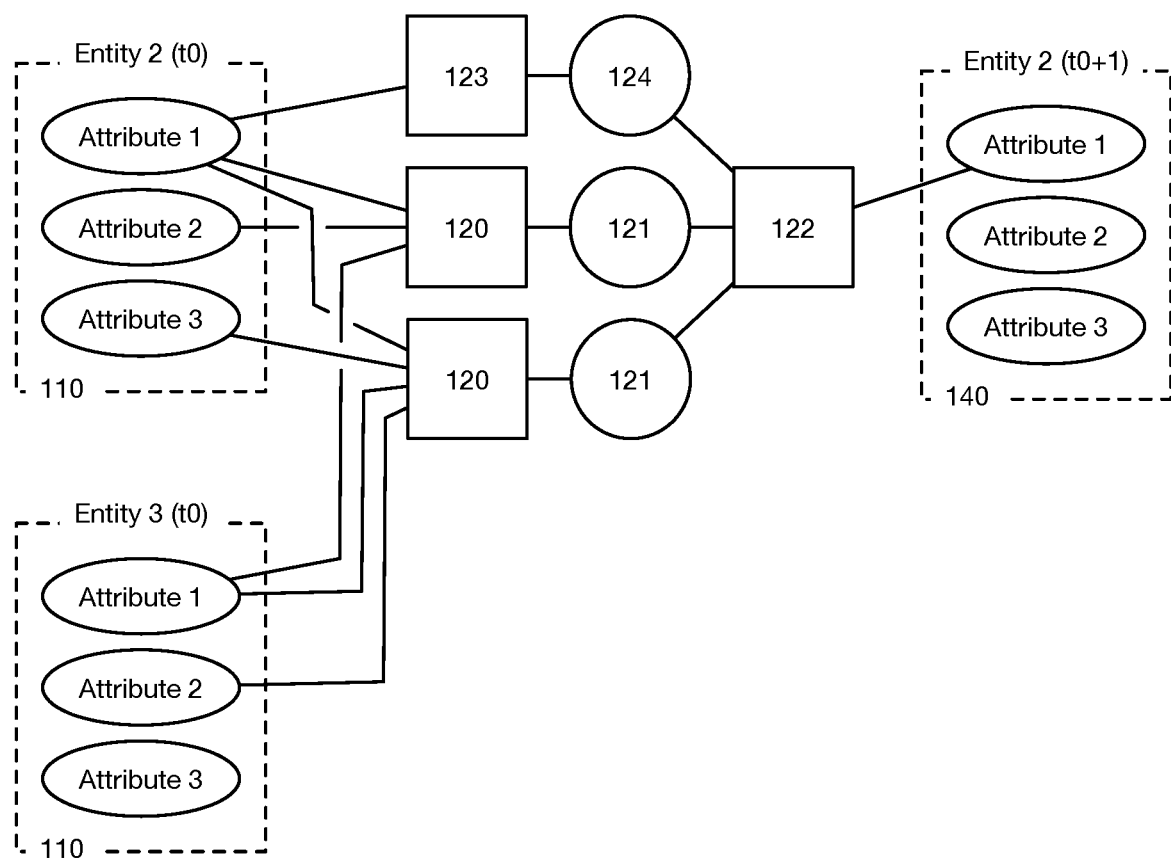
FIG. 6 is a factor graph representation of a system of an invention embodiment.

While schema factors 120 preferably couple variables of exactly two entities, schema factors 120 may additionally or alternatively couple to any number of variables, states, and/or entities. The system 100 may additionally or alternatively include a self-transition factor 123 and self-transition variable 124, as shown in FIG. 6. The self-transition factor 123 and self-transition variable 124 model the probability of a state change occurring in the absence of any predicted state change by a schema factor 120.

Schema factors 120 may have any activation function; e.g., logical functions such as a Boolean-based selection function for AND, OR, NOT, XOR operations of node selection. Note that schema factors 120 (and other factors of the system 100) may be either deterministic or probabilistic, enabling the use of uncertainty in a model.

Figure 7A:
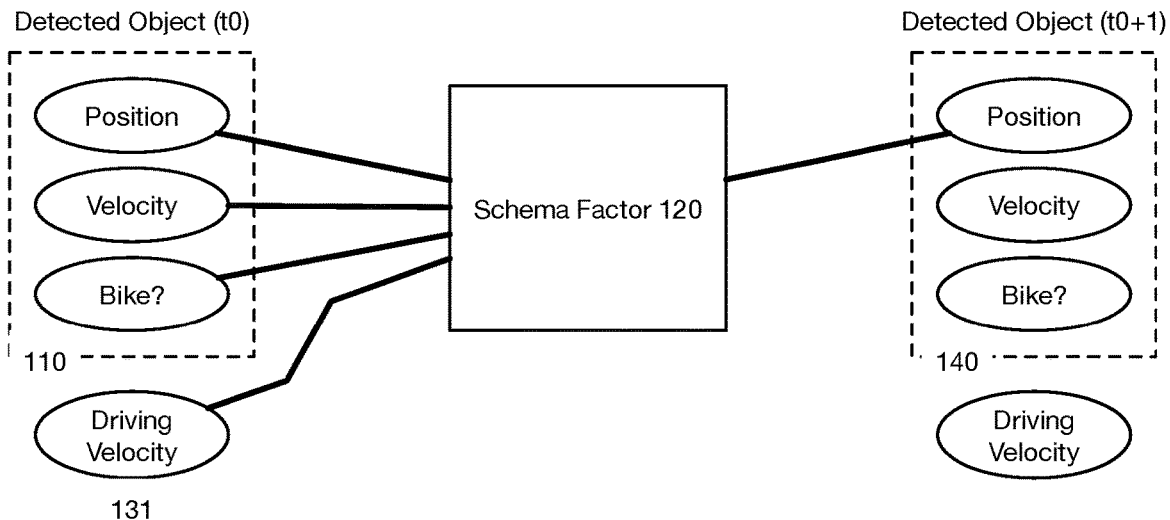
FIGS. 7A and 7B are factor graph representations of a system of an invention embodiment.
Figure 7B:
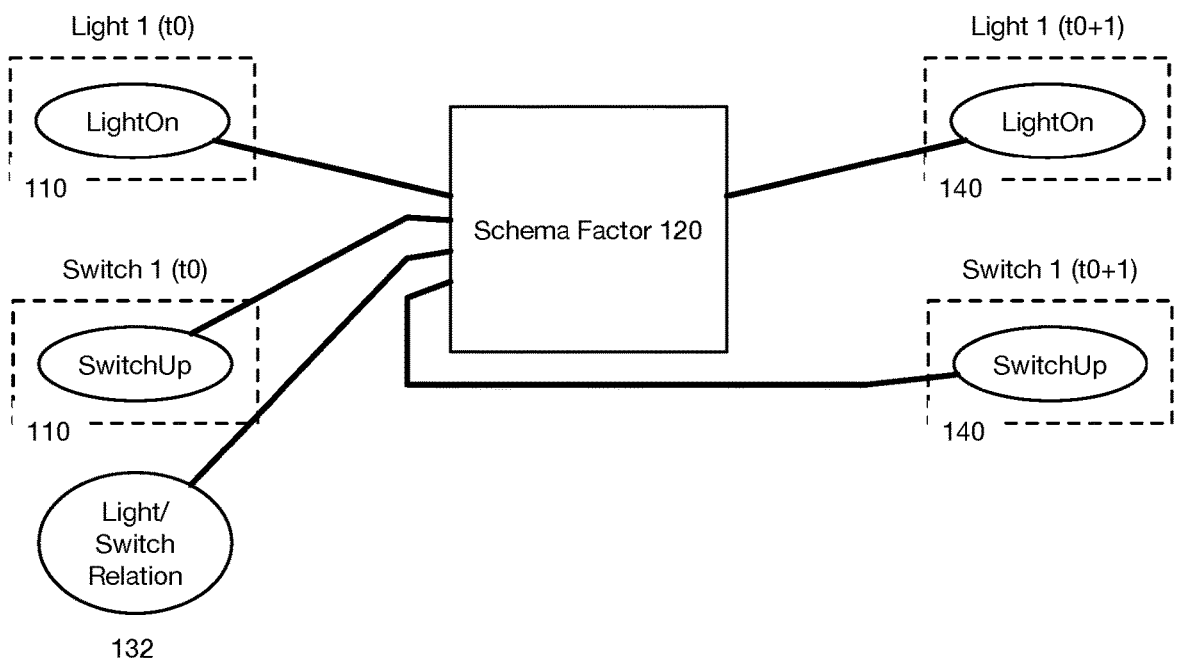

Context variables 130 are variables not exclusively associated with an entity. While the system 100 may include any type of variable not exclusively associated with an entity, two examples of context variables 130 are external context variables 131 and relationship variables 132. External context variables 131 are variables not directly linked to any entity. For example, for a vision system connected to an autonomous vehicle, the velocity of the vehicle (relevant to physical predictions about perceived visual data) may be an external context variable 131, as shown in FIG. 7A. External context variables 131 can also include 'action' variables: e.g., in an arcade game, control signals (MoveUp, MoveDown, etc.). Relationship variables 132 are latent variables that encode attributes of a relationship between two or more entities (as opposed to the previously mentioned latent variables, which encode attributes of individual entities). For example, two light switches (each an entity) may each control a different light within a room. Since the wiring of the switches is not observable, relationship variables 132 may be used to store which switches link to which lights. For example, a schema factor 120 controlling the first of these two lights is as shown in FIG. 7B.

Note that the number of observed entities within the system 100 may change at different times. The creation and/or deletion of observed entities may themselves be predicted and/or explained by variables (e.g., an 'exists' variable).

Figure 8:
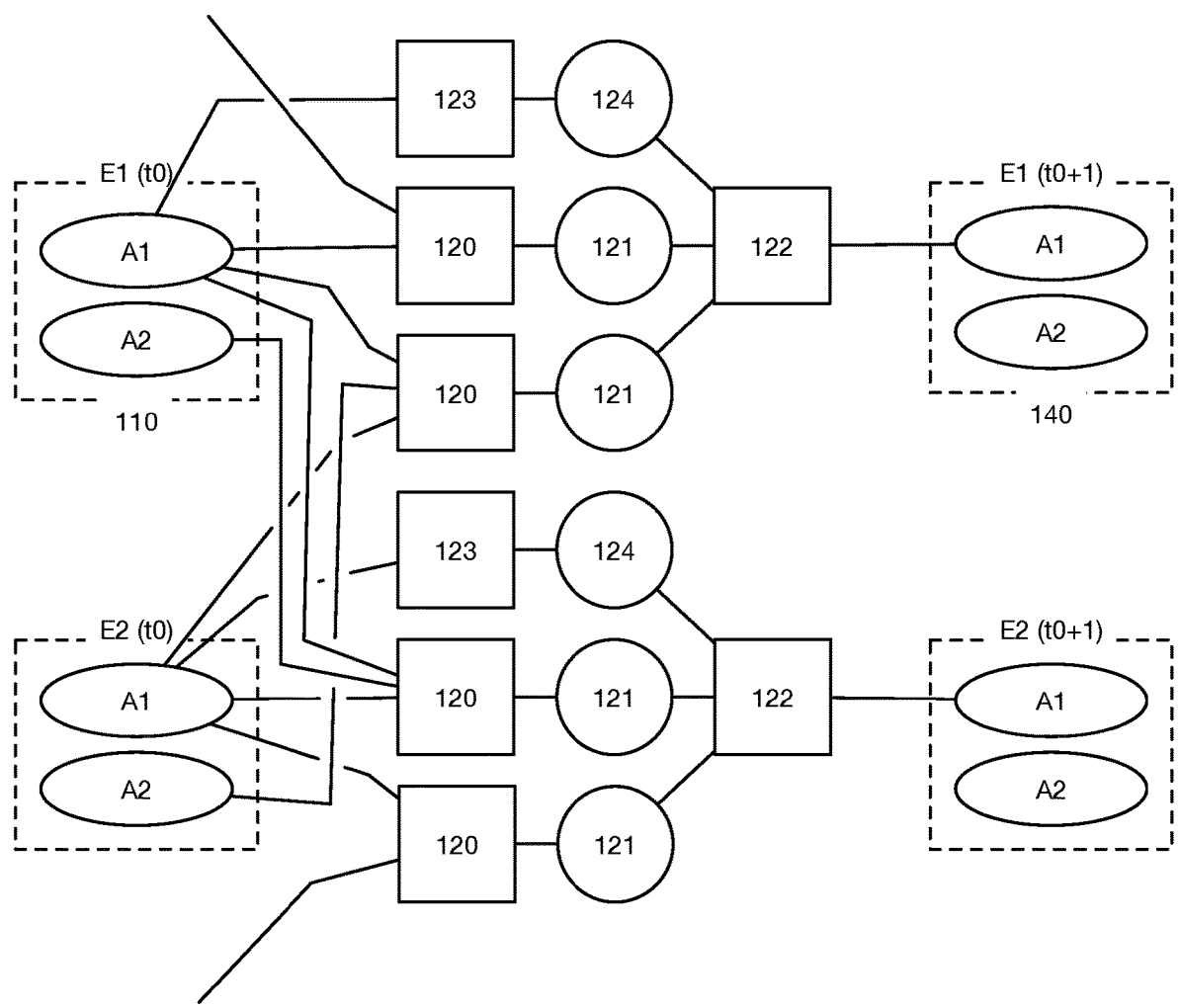
FIG. 8 is a factor graph representation of a system of an invention embodiment.

The system 100 may be represented in any suitable manner (e.g., as a Bayesian network). In one implementation of an invention embodiment, the system 100 is constructed in a factor graph representation using binary random variable nodes (represented by circles/ovals) and factor nodes (represented by squares/rectangles), as shown in FIG. 8.

Here, the state representation is factored into a set of N entity states $S=\{s_1, \ldots, s_N\}$ where N is the number of entities and each entity state is an assignment of binary attributes $s_i=\{s_{i,1}, \ldots, s_{i,M}\}$. This factored state representation allows for the factorization of the transition distribution $$T(s^{t+1}|s^t,a^t)=\Pi_{i=1}^N\Pi_{j=1}^M T_{i,j}(s_{i,j}^{t+1}|s^t,a^t)$$

where $a^t$ is some action executed in $s^t$. Each transition $T_{i,j}$ is modeled by a factor graph comprising: 1) a set of variable nodes corresponding to attributes of entities in state $s^t$ (including the transition target $s_{i,j}^t$), 2) a set of schema factor nodes, 3) a set of schema variable nodes (one coupled to each factor node), 4) a self-transition factor node, 5) a self-transition variable node, 6) a schema OR factor node and 7) the transition target (a variable node) after transition: $s_{i,j}^{t+1}$ (e.g., as shown in FIG. 6).

In this implementation, the schema factor nodes are AND factor nodes defined by:

$$\text{AND }(v_1, \ldots, v_n)=\Pi_{i=1}^n Pr(v_i=1)$$

the schema OR factor nodes are OR factor nodes defined by:

$$\text{OR }(v_1, \ldots, v_n)=1-\Pi_{i=1}^n 1-Pr(v_i=1)$$

and the self-transition factor node is a factor node as follows:

$$\Lambda_{i,j}=\text{AND }(\neg\Phi_1, \ldots, \neg\Phi_k, s_{i,j})$$

where $\Phi$ are schemas. Accordingly, transition distributions can be calculated as $$T_{i,j}=(s_{i,j}^{t+1}|s^t)=\text{OR }(\Phi_{i,j}^1, \ldots, \Phi_{i,j}^Q, \Lambda_{i,j})$$

State prediction is straightforward given the aforementioned transition distributions. Planning (e.g., searching for action sequences that either achieve or avoid a given set of entity attribute state and/or reward states at given times) is preferably accomplished by belief propagation combined with forward and/or backward search. In one implementation, planning can aim to maximize the sum (or exponentially discounted sum) of all predicted rewards across a given number of timesteps. A belief propagation stage preferably recursively calculates which entity states are reachable at each time step, via forward propagation, and/or recursively calculates which entity states are conditions to achieve a target state, via backward propagation. Depending on the task, both max-product and sum-product belief propagation are possible. The belief propagation stage preferably is performed for a maximum number of time steps or until the target state is achieved. To maximize the probability of avoiding a state, the system 100 may attempt to find a plan that violates at least one condition of each schema that predicts the state to occur. In one implementation, this method can be used to avoid negative rewards. Alternatively, state prediction and planning may be accomplished in any manner.

The system 100 is preferably coupled to an entity observation network such as the recursive cortical network (RCN) of U.S. patent application Ser. No. 13/895,225, the entirety of which is incorporated by this reference. Additionally or alternatively, the system 100 may be coupled to any neural network capable of defining entities, detecting entities, and/or observing entity attributes. Alternatively, the system 100 may be not coupled to a neural network.

If the system 100 is connected to an entity observation network (e.g., a visual hierarchy), that network may interact with the system 100 in several ways. For example, a visual hierarchy may be used to 1) track entities and report observable attributes (e.g., position) to the system 100, 2) infer latent variables from visual data alone, and/or 3) predict a future visual state based on predictions of the system 100.

For example, a visual network may observe a particular pool (coupled to a group of visual network features and corresponding to an entity of a schema network). If the visual network knows that the entities of this pool typically move together, the visual network can use this information to set latent attributes of the entities in question, enabling better prediction. Likewise, each pool state may correspond to a different entity state.

Figure 9A:
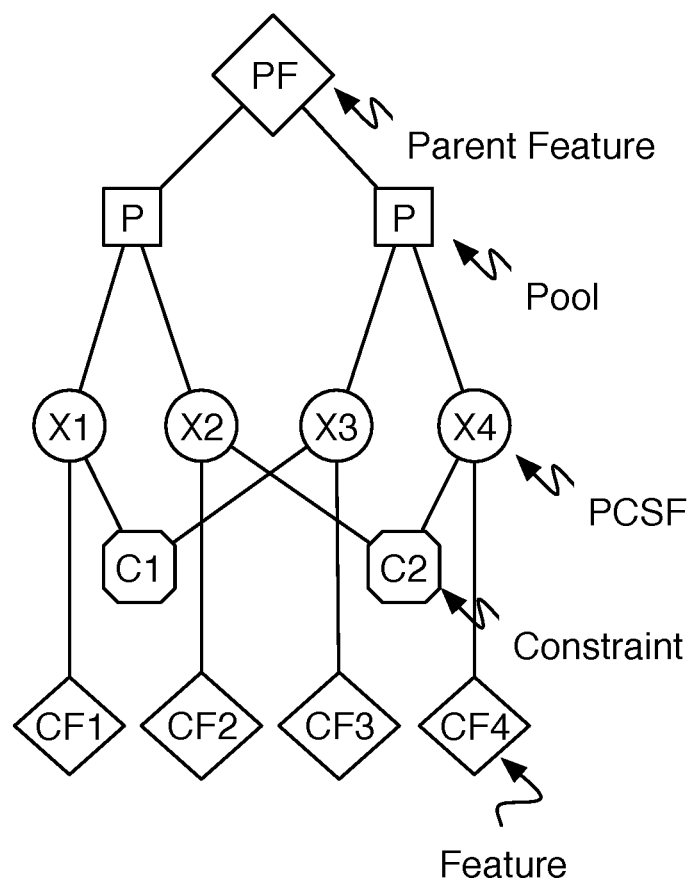
FIG. 9A is a network representation of a recursive cortical network.
Figure 9B:
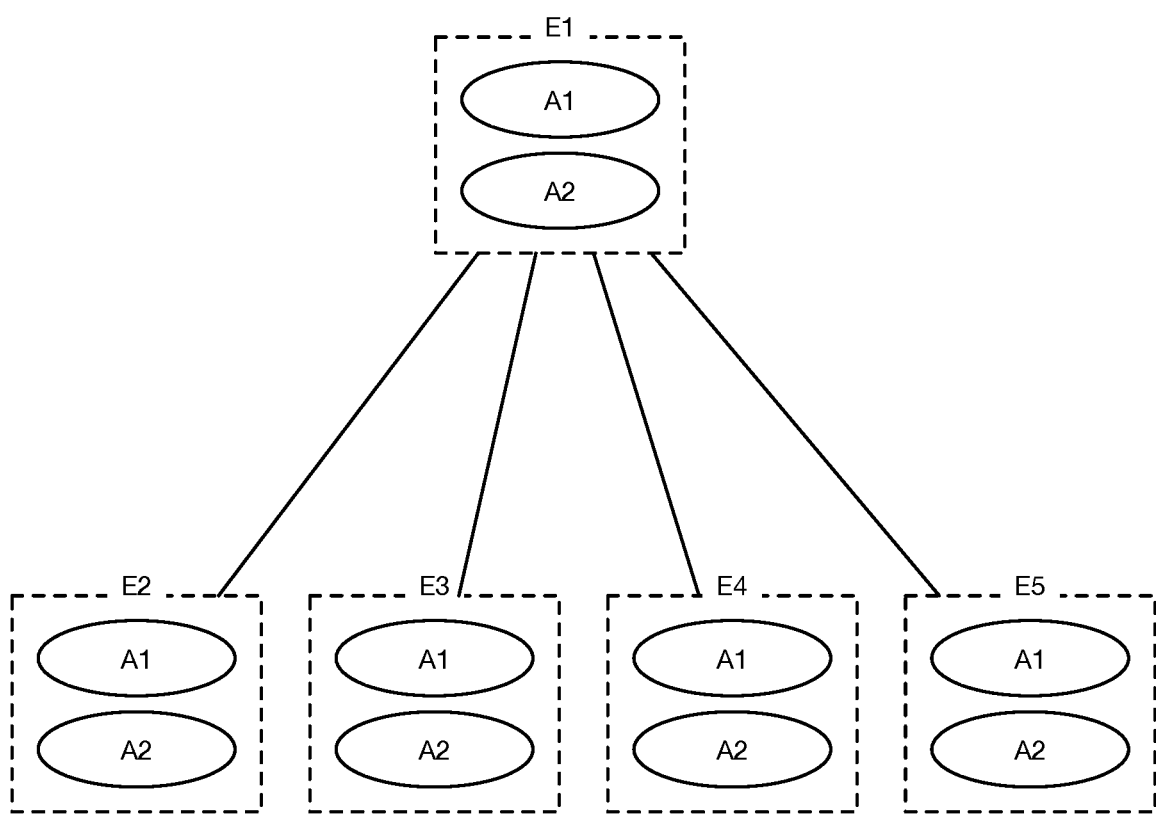
FIG. 9B is a hierarchical representation of entity relationships of a system of an invention embodiment.
Figure 10:
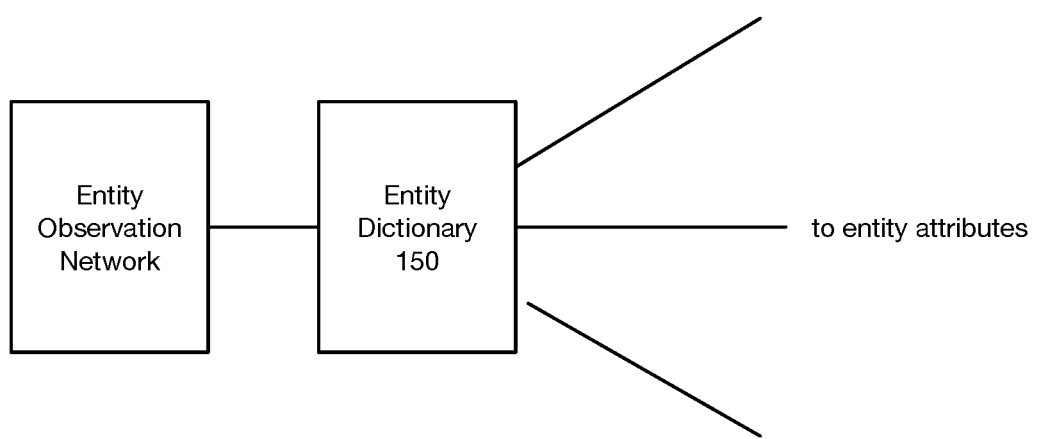
FIG. 10 is a network representation of an entity dictionary of a system of an invention embodiment and connections.

Further, the hierarchy of the visual network may be used to create a hierarchy of entities. For example, features of an RCN subnetwork as shown in FIG. 9A may correspond to entities in an example system 100 as shown in FIG. 9B; PF (parent feature) corresponds to E1, CF1 corresponds to CF2, and so on. An update to a latent variable of E1 may, using this hierarchy, be pushed to entities below it in the hierarchy (E2, E3, E4, E5), or vice versa (from children to parents). For example, two halves of a ball may represent child entities, while the entire ball is a parent entity. If a first half of the ball is bouncy, then the whole ball is likely to be bouncy (propagation from child to parent), and likewise, the other half of the ball is likely to be bouncy (propagation from parent to the sibling of the first child).

Entities may be connected at any level or subnetwork to entity observation networks. Further, entity observation networks may pass information to the system 100 in any manner. In one example, an entity observation network passes information to an entity dictionary 150 as shown in FIGURE to; this dictionary may contain information such as entity identifiers, attribute estimates for entities, state measurements, etc. In this example, either or both of the entity observation network and the system 100 may update entity dictionary 150 values. Additionally or alternatively, the entity dictionary 150 may be updated in any manner.

2. Schema Network Learning

Figure 11:
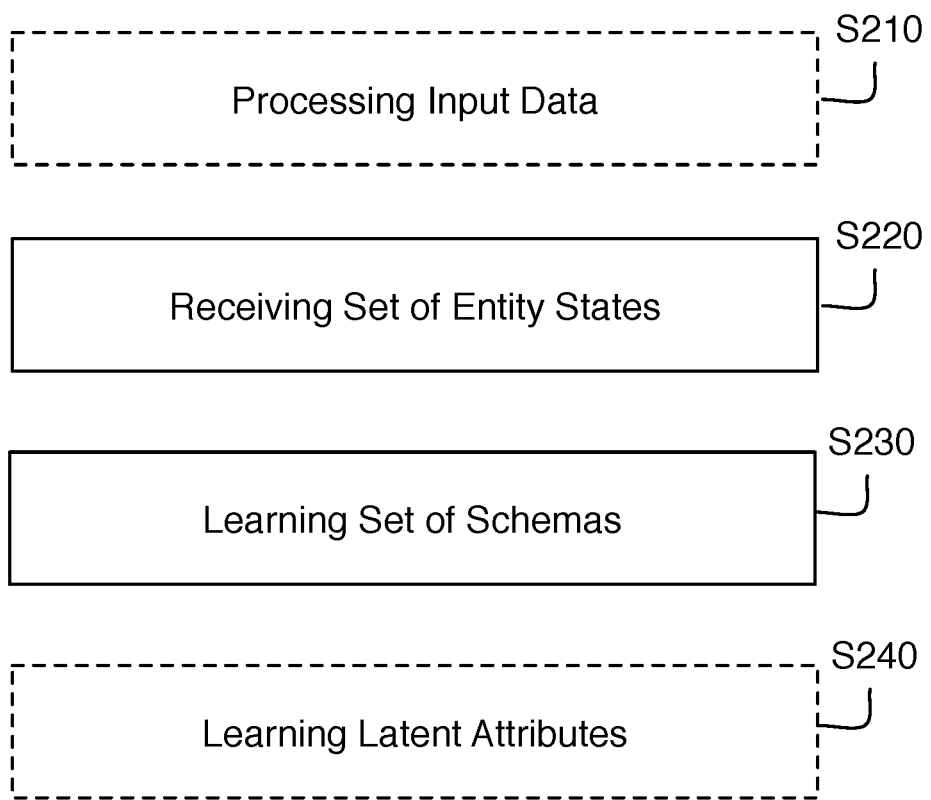
FIG. 11 is a chart representation of a method of an invention embodiment.

A method 200 for event prediction using schema networks includes receiving a set of entity states S220 and learning a set of schemas S230, as shown in FIG. 11. The method 200 may additionally or alternatively include processing input data S210 and/or learning latent attributes S240.

The method 200 functions to set structure of a schema network such that the schema network is enabled to perform event prediction and/or explanation based on the training set data (ideally generalizable to other data). The method 200 is preferably implemented by a computing system (e.g., computer, distributed computing system, etc.).

S210 includes processing input data. S210 functions to produce a set of entity states (S) from a set of input data (e.g., a set of images), actions, and rewards. Entities are preferably specified using an entity observation network (e.g., an RCN operating on visual data that creates entities from observed features), but may be specified in any manner. Input data may be any set of data for which inference or generation is desired; e.g., images, video, audio, speech, medical sensor data, natural language data, financial data, application data, traffic data, environmental data, etc.

S210 may additionally or alternatively include preprocessing input data to remove contradictions (e.g., the same input appearing twice with different labels).

S210 preferably includes, for each entity state, recording the states of all entities within local neighborhoods (relatively to the entities' current positions). These states can be converted in to a fixed-length binary feature vector for a given number of attributes and neighborhood size. For example, if each entity includes two observable attributes, and the neighborhood includes eight adjacent neighbors (e.g., a pixel surrounded by nearest pixels), the binary feature vector has 18 elements. Alternatively, S210 may produce entity states in any manner.

S220 includes receiving a set of entity states. Entity states are preferably those generated in S210, but may additionally or alternatively be received from any source (e.g., from an external entity detection system, via hardcoding, etc.).

For each timestep, the output of the schema network being trained is an estimation of y, a binary vector representing the outputs corresponding to input entity states X. X may be represented by a matrix of dimension N×D (where N is the number of entities and D is the length of the binary feature vector previously described). The output of the schema network for this prediction task is thus:

$$\hat{y} = f_W(X) = \overline{XW} \vec{1}$$

where W is a matrix of dimension D×M (M representing the number of schemas, each column representing an individual schema). W is preferably initialized as an empty set (filled in in S230).

S230 includes learning a set of schemas. S230 preferably includes modifying the set of schemas (i.e., the matrix W) to reduce the prediction error of the schema network as previously described. S230 may include measuring prediction error using any suitable objective function; for example:

$$\min_{W \in \{0,1\}^{D \times M}} \frac{1}{N} |y - f_W(X)|_1 + C|W|_1$$

where the first term computes the prediction error, the second term estimates the complexity, and parameter C controls the trade-off between the two.

S230 may find a solution to this objective function in any manner. In one implementation of an invention embodiment, S230 includes learning the set of schemas using a greedy solution in which linear programming (LP) relaxations are used to find new schema.

In this implementation, S230 takes as input vectors $\{x_n\}$ for which $f_W(x_n)=0$ and the corresponding output scalars $y_n$. Next, S230 includes finding a cluster of input samples that can be solved with a single (relaxed) schema while keeping precision. Selecting an input sample and placing it in a "solved" set, S230 preferably solves the following:

$$\min_{w \in \{0,1\}^D} \sum_{n: y_n = 1} (1 - x_n) w$$

such that $(1-x_n)w > 1 \; \forall_{n: y_n = 0}$ and $(1-x_n)w = 0 \; \forall_{n \in solved}$.

Then, S230 preferably simplifies the resulting schema w by placing all samples for which $(1-x_n)w=0$ in the "solved" set and solving:

$$\min_{w \in \{0,1\}^D} w^T \vec{1}$$

such that $(1-x_n)w > 1 \; \forall_{n: y_n = 0}$ and $(1-x_n)w = 0 \; \forall_{n \in solved}$.

If the found schema w is binary, S230 includes adding the schema to the network W. If not, S230 may repeat the previous minimization using binary programming, but only optimizing over the elements of w found to be non-zero (clamping the others to zero).

In this implementation, preferably only the input-output pairs for which the current schema network is predicting an output of zero are passed, and the process of adding new schemas preferably stops when a predefined complexity limit is reached. Alternatively, S230 may include stopping schema network addition in any manner (e.g., after a time limit or a certain number of schema additions).

While these steps describe how schema networks are found for a given transition, it is understood that S230 may be used to determine schema networks that apply across many or all transitions contained within an input dataset (e.g., by refining the schema network using this technique on successive timestep transitions).

S240 includes learning latent attributes. While S230 functions to learn schemas based on observed attributes (and potentially hardcoded or otherwise provided attributes), S240 functions to create new attributes that may describe entity behavior. S240 is preferably useful in cases where an event cannot be predicted to a threshold reliability with any current variables; alternatively, S240 may be used for any purpose.

S240 preferably includes adding a latent variable to the entity states involved in a given transition if the schema predicting a particular event fails to meet a reliability threshold. Alternatively, S240 may add latent variables in any case where a latent variable improves schema performance.

Latent variables added by S240 are preferably specific to a given schema, but S240 may include testing the latent variables to see if they improve performance in other schemas; in this case, S240 may include applying the latent variables across multiple or all schemas.

Figure 12:
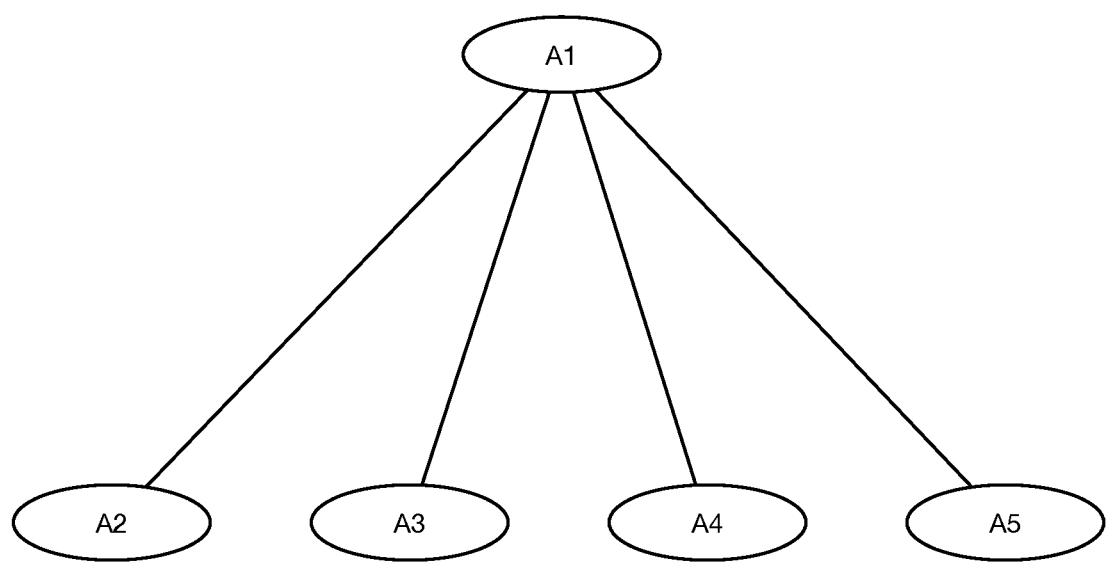
FIG. 12 is a network representation of attribute hierarchy of a method of an invention embodiment.

S240 may additionally or alternatively include learning latent variable structure, as shown in FIG. 12. Such structure, once learned, can be used to infer all variable states in a given latent variable structure from a single latent variable observation.

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system comprising one or more computers and one or more storage devices storing instructions that are operable, when executed by the one or more computers, to cause the one or more computers to perform operations comprising:
storing a first schema factor network that is configured to generate a prediction of a goal entity state representing an entity at a later time from an antecedent entity state representing an entity at an earlier time;
performing a backward message passing procedure from the goal entity state to the antecedent entity state through the first schema factor network to determine a cause of a transition from the antecedent entity state to the goal entity state; and
using the cause of the transition to generate a plan comprising a sequence of one or more actions that achieve the goal entity state from the antecedent entity state.

2. The system of claim 1, wherein backward message passing enables regression planning to determine the first value based on the second value.

3. The system of claim 1, wherein a first schema factor of the first schema factor network comprises an OR factor, wherein the OR factor is connected to a first attribute and a second attribute of a second antecedent entity state, wherein the second antecedent entity state is associated with a second entity at the first time.

4. The system of claim 3, wherein the first schema factor comprises a self-transition factor, wherein the self-transition factor is a variable that is associated with a probability that the first value will be different from the second value.

5. The system of claim 1, wherein the a first schema factor of the first schema factor network comprises an AND factor, wherein the AND factor is connected to a first attribute and an action associated with the antecedent entity state.

6. The system of claim 5, wherein the action is separate from the antecedent entity state.

7. The system of claim 1, wherein the goal entity state and a second goal entity state are connected to a first schema factor of the schema factor network, wherein the first schema factor is connected to a third goal entity state, wherein the second goal entity state represents a second entity at the second time, and wherein the third goal entity state represents the first entity at a third time.

8. The system of claim 1, wherein the antecedent entity state comprises a first attribute having a first value, and wherein the consequent entity state comprises the first attribute having a second value, and wherein the first attribute is a binary variable.

9. The system of claim 1, wherein the antecedent entity state comprises a first attribute having a first value, and wherein the consequent entity state comprises the first attribute having a second value, and wherein the first attribute is a continuous variable discretized into multiple binary variables.

10. The system of claim 1, wherein the antecedent entity state is determined by a visual network.

11. A method comprising:
storing a first schema factor network that is configured to generate a prediction of a goal entity state representing an entity at a later time from an antecedent entity state representing an entity at an earlier time;
performing a backward message passing procedure from the goal entity state to the antecedent entity state through the first schema factor network to determine a cause of a transition from the antecedent entity state to the goal entity state; and
using the cause of the transition to generate a plan comprising a sequence of one or more actions that achieve the goal entity state from the antecedent entity state.

12. The method of claim 11, wherein backward message passing enables regression planning to determine the first value based on the second value.

13. The method of claim 11, wherein a first schema factor of the first schema factor network comprises an OR factor, wherein the OR factor is connected to a first attribute and a second attribute of a second antecedent entity state, wherein the second antecedent entity state is associated with a second entity at the first time.

14. The method of claim 13, wherein a first schema factor of the first schema factor network comprises an AND factor, wherein the AND factor is connected to a first attribute and an action associated with the antecedent entity state.

15. The method of claim 14, wherein the action is separate from the antecedent entity state.

16. The method of claim 13, wherein the first schema factor comprises a self-transition factor, wherein the self-transition factor is a variable that is associated with a probability that the first value will be different from the second value.

17. The method of claim 11, wherein the goal entity state and a second goal entity state are connected to a first schema factor of the first schema factor network, wherein the first schema factor is connected to a third goal entity state, wherein the second goal entity state represents a second entity at the second time, and wherein the third goal entity state represents the first entity at a third time.

18. The method of claim 11, wherein the antecedent entity state comprises a first attribute having a first value, and wherein the consequent entity state comprises the first attribute having a second value, and wherein the first attribute is a binary variable.

19. The method of claim 11, wherein the antecedent entity state comprises a first attribute having a first value, and wherein the consequent entity state comprises the first attribute having a second value, and wherein the first attribute is a continuous variable discretized into multiple binary variables.

20. The method of claim 11, wherein the antecedent entity state is determined by a visual network.

21. One or more non-transitory computer storage media encoded with computer program instructions that when executed by one or more computers cause the one or more computers to perform operations comprising:
storing a first schema network that is configured to generate a prediction of a goal entity state representing an entity at a later time from an antecedent entity state representing an entity at an earlier time;
performing a backward message passing procedure from the goal entity state to the antecedent entity state through the first schema factor network to determine a cause of a transition from the antecedent entity state to the goal entity state; and using the cause of the transition to generate a plan comprising a sequence of one or more actions that achieve the goal entity state from the antecedent entity state.

\* \* \* \* \*